United States Patent
Nukui

(10) Patent No.: US 10,394,397 B2
(45) Date of Patent: Aug. 27, 2019

(54) MANUFACTURING METHOD OF TOUCH SENSOR FILM

(71) Applicant: FUJIFILM Corporation, Tokyo (JP)

(72) Inventor: Katsuyuki Nukui, Ashigara-kami-gun (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 80 days.

(21) Appl. No.: 15/437,586

(22) Filed: Feb. 21, 2017

(65) Prior Publication Data

US 2017/0177118 A1    Jun. 22, 2017

Related U.S. Application Data

(63) Continuation of application No. PCT/JP2015/071659, filed on Jul. 30, 2015.

(30) Foreign Application Priority Data

Aug. 29, 2014 (JP) ................. 2014-175929

(51) Int. Cl.
*G06F 3/041* (2006.01)
*G06F 3/044* (2006.01)

(52) U.S. Cl.
CPC ............... *G06F 3/044* (2013.01); *G06F 3/041* (2013.01); *G06F 2203/04103* (2013.01); *G06F 2203/04112* (2013.01)

(58) Field of Classification Search
CPC ..................................................... G06F 3/041
See application file for complete search history.

(56) References Cited

U.S. PATENT DOCUMENTS

2011/0151215 A1* 6/2011 Kobayashi ............... B32B 7/02
                                                    428/212
2013/0175154 A1* 7/2013 Takahashi ............... G06F 3/044
                                                    200/600

(Continued)

FOREIGN PATENT DOCUMENTS

CN         102576581 A     7/2012
CN         103814348 A     5/2014

(Continued)

OTHER PUBLICATIONS

International Search Report for application No. PCT/JP2015/071659 dated Oct. 27, 2015.

(Continued)

*Primary Examiner* — Vijay Shankar
*Assistant Examiner* — Cory A Almeida
(74) *Attorney, Agent, or Firm* — Sughrue Mion, PLLC

(57) ABSTRACT

A touch sensor film preventing moire occurring in accordance with deformation of a support is manufactured by performing roll transportation of an elongated transparent support 1 having a thickness smaller than 80 μm using a plurality of pass rollers 4, 5, and 6; performing annealing treatment with respect to the support 1 at a temperature which is equal to or lower than a temperature obtained by adding 35° C. to a dynamic glass transition temperature of the support 1; and forming a mesh pattern formed of thin metal wires 8*a* on a surface of the support 1 subjected to the annealing treatment.

12 Claims, 8 Drawing Sheets

(56) References Cited

U.S. PATENT DOCUMENTS

| | | | | |
|---|---|---|---|---|
| 2013/0258570 A1* | 10/2013 | Nashiki | ................... | G06F 3/044 |
| | | | | 361/679.01 |
| 2014/0240622 A1 | 8/2014 | Watazu et al. | | |
| 2015/0055033 A1* | 2/2015 | Imamura | ................... | B32B 7/02 |
| | | | | 349/12 |
| 2015/0140287 A1* | 5/2015 | Poon | ........................ | H01B 1/02 |
| | | | | 428/195.1 |

FOREIGN PATENT DOCUMENTS

| | | |
|---|---|---|
| JP | 2007-134293 A | 5/2007 |
| JP | 2009-059666 A | 3/2009 |
| JP | 2013-214545 A | 10/2013 |
| WO | 2013/146483 A1 | 10/2013 |
| WO | 2014/069624 A1 | 5/2014 |

OTHER PUBLICATIONS

International Preliminary Report on Patentability with translation of Written Opinion issued from the International Bureau in counterpart International Application No. PCT/JP2015/071659, dated Mar. 9, 2017.

Communication dated Aug. 1, 2017, from the Japanese Patent Office in counterpart application No. 2016-545399.

Communication dated Dec. 4, 2018, from State Intellectual Property Office of the P.R.C. in counterpart application No. 201580042603.0.

* cited by examiner

MANUFACTURING METHOD OF TOUCH SENSOR FILM

CROSS-REFERENCE TO RELATED APPLICATIONS

This application is a Continuation of PCT International Application No. PCT/JP2015/071659 filed on Jul. 30, 2015, which claims priority under 35 U.S.C. § 119(a) to Japanese Patent Application No. 2014-175929 filed on Aug. 29, 2014. The above application is hereby expressly incorporated by reference, in its entirety, into the present application.

BACKGROUND OF THE INVENTION

1. Field of the Invention

The present invention relates to a manufacturing method of a touch sensor film, a touch sensor film, and a touch panel, and particularly relates to a manufacturing method of a touch sensor film of forming a mesh pattern formed of thin metal wires on a surface of a support, a touch sensor film, and a touch panel.

2. Description of the Related Art

In recent years, touch panels which are used in combination with display devices such as liquid crystal display devices and perform an input operation to an electronic device by coming into contact with a screen, in various electronic devices such as portable information devices have come into wide use. As electrodes used in the touch panels, the use of mesh electrodes formed of thin metal wires having low electric resistance has been proposed in order to improve a response speed.

Here, in touch panels using mesh electrodes, moire (interference fringe) may occur due to interference between a mesh pattern of mesh electrodes and pixel array patterns of a display (an array pattern of a RGB color filter, a black matrix pattern, and the like). Therefore, a touch panel preventing visibility of moire has been developed.

JP2013-214545A, for example, discloses a touch sensor film which imparts irregularities to a mesh pattern in which the sum of intensities of moire at which frequencies of moire are in predetermined frequency range determined in accordance with visual response characteristics, in regards to frequencies and intensities of moire obtained by applying visual response characteristics of human to frequency information and intensity information of moire which are respectively calculated from peak frequencies and peak intensities of both two-dimensional Fourier spectra of transmittance image data of the mesh pattern and transmittance image data of the pixel array pattern, is equal to or smaller than a predetermined value.

SUMMARY OF THE INVENTION

However, it was found that, even in a case where a mesh electrode was formed on a support of a touch panel using the mesh pattern disclosed in JP2013-214545A, moire occurred due to a deviation of a position of the mesh electrode caused by particularly significant deformation occurring when manufacturing a mesh electrode by performing roll transportation using a thin support.

When a thickness of a support of a touch sensor film is decreased in order to form a thin touch panel, rigidity of the support is decreased according thereto, and accordingly, thermal shrinkage of the support is deteriorated (an absolute value of thermal shrinkage is increased). Thus, it is considered that, in a case of using a thin support, a support is subjected to annealing treatment at a high temperature, that is, shrinkage treatment, to realize low thermal shrinkage of the support (see JP2009-059666A). In a case where a touch sensor film is formed with a support which is not subjected to low thermal shrinkage treatment, a deformation in dimensions of a support due to a temperature or humidity significantly occurs, and accordingly, dimensions of a mesh electrode pattern prepared using dimensioning at high accuracy easily change. The inventors have found a new problem that, in a case of performing shrinkage treatment while performing roll transportation of an elongated support using a plurality of pass rollers, streak-like wrinkles W extending in a machine direction (MD direction) are formed on a support 31, as shown in FIG. 12. The streak-like wrinkles W generated on the support 31 are fixed by coming into contact with a pass roller and being cooled, and this causes plastic deformation of the support 31 to a shape similar to a galvanized sheet.

By doing so, in a case of forming a plate-shaped transparent electrode on a support using indium tin oxide, the streak-like wrinkles W fixed to the support 31 do not affect visibility of display. However, as shown in FIG. 13, in a case of forming a mesh electrode formed of thin metal wires 32, the streak-like wrinkles W are smoothed when loading the support 31 on a smooth surface of a display device or the like (may be pasting to a cover glass), and thus, moire occurs due to a deviation of a position of the mesh electrode formed of thin metal wires 32 formed on the support 31 according thereto.

The invention is made to address the aforementioned problems and an object thereof is to provide a manufacturing method of a touch sensor film, a touch sensor film, and a touch panel preventing moire occurring in accordance with deformation of a support.

According to the invention, there is provided a manufacturing method of a touch sensor film, comprising: performing roll transportation of an elongated transparent support having a thickness smaller than 80 μm using a plurality of pass rollers; performing annealing treatment with respect to the support at a temperature which is equal to or lower than a temperature obtained by adding 35° C. to a dynamic glass transition temperature of the support; and forming a mesh pattern formed of thin metal wires on a surface of the support subjected to the annealing treatment.

Here, it is preferable that the support is transported at a temperature equal to or higher than a static glass transition temperature and lower than a dynamic glass transition temperature of the support, after performing the annealing treatment with respect to the support and until the support reaches a first pass roller, and the temperature of the support is decreased to a temperature lower than the static glass transition temperature while the support reaches a second pass roller from the first pass roller.

In addition, an interval between the first pass roller and the second pass roller is preferably within 30 cm and more preferably within 20 cm.

In addition, it is preferable that the annealing treatment is performed at a temperature equal to or higher than a temperature obtained by subtracting 10° C. from the dynamic glass transition temperature, and it is more preferable that the annealing treatment is performed at a temperature equal to or lower than a temperature obtained by adding 25° C. to the dynamic glass transition temperature.

In addition, it is preferable that the thickness of the support is smaller than 50 μm.

According to the invention, there is provided a touch sensor film comprising: a transparent support having a thickness smaller than 80 μm; and mesh electrodes which are disposed on surfaces of the support and have a mesh pattern formed of thin metal wires, in which, in the support provided with the mesh electrodes, an absolute value of thermal shrinkage in a machine direction is within 0.6%, an absolute value of thermal shrinkage in a transverse direction orthogonal to the machine direction is within 0.2%, and a ten-point average roughness of a surface ruggedness shape is equal to or smaller than 6.1 μm.

Here, it is preferable that the ten-point average roughness of the surface ruggedness shape is equal to or smaller than 4.5 μm.

In addition, it is preferable that the thickness of the support is smaller than 50 μm.

According to the invention, there is provided a touch panel comprising: a touch sensor film including a transparent support having a thickness smaller than 80 μm, and mesh electrodes which are disposed on surfaces of the support and have a mesh pattern formed of thin metal wires, wherein, in the support provided with the mesh electrodes, an absolute value of thermal shrinkage in a machine direction is within 0.6%, an absolute value of thermal shrinkage in a transverse direction orthogonal to the machine direction is within 0.2%, and a ten-point average roughness of a surface ruggedness shape is equal to or smaller than 6.1 μm. Here, it is preferable that the ten-point average roughness of the surface ruggedness shape is equal to or smaller than 4.5 μm. In addition, it is preferable that the thickness of the support is smaller than 50 μm.

According to the invention, since the annealing treatment is performed with respect to the support at a temperature which is equal to or lower than a temperature obtained by adding 35° C. to a dynamic glass transition temperature of the support having a thickness smaller than 80 μm, it is possible to provide a manufacturing method of a touch sensor film, a touch sensor film, and a touch panel preventing moire occurring in accordance with deformation of the support.

DESCRIPTION OF THE PREFERRED EMBODIMENTS

Hereinafter, embodiments of the invention will be described with reference to accompanying drawings.

According to the invention, there is provided a manufacturing method of a touch sensor film including: performing roll transportation of an elongated transparent support having a thickness smaller than 80 μm using a plurality of pass rollers; performing annealing treatment with respect to the support at a temperature which is equal to or lower than a temperature obtained by adding 35° C. to a dynamic glass transition temperature of the support; and forming a mesh pattern formed of thin metal wires on a surface of the support subjected to the annealing treatment.

[Manufacturing Method of Touch Sensor Film]

(Manufacturing Method of Support)

Figure 1:
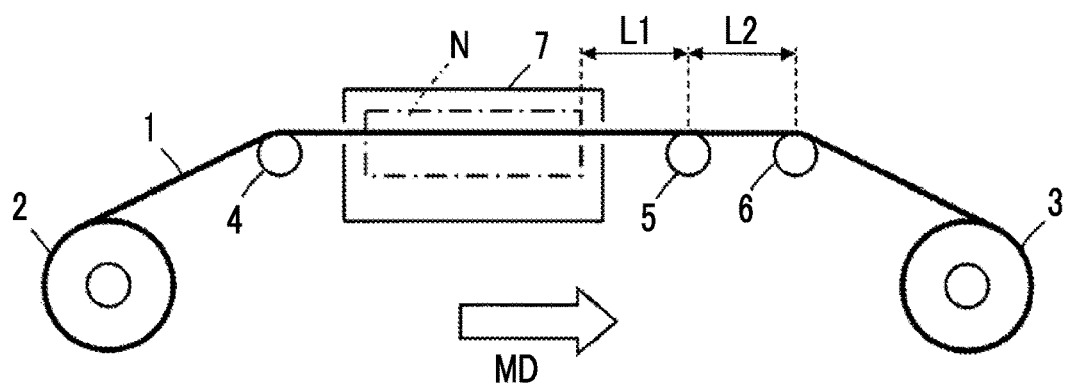
FIG. 1 is a view showing a manufacturing method of a touch sensor film according to the invention.

FIG. 1 shows an example of a manufacturing method of a touch sensor film.

First, an elongated transparent support 1 having a thickness smaller than 80 μm is attached to a delivery roller 2 and a winding roller 3 which are disposed at a predetermined interval, in a state of being wound in a roll form. Three pass roller 4, 5, and 6, and a heater 7 for performing annealing treatment with respect to the support 1 are disposed between the delivery roller 2 and the winding roller 3, and the support 1 is transported from the delivery roller 2 towards the winding roller 3 via the heater 7 by the pass roller 4, 5, and 6.

The support 1 is configured with a transparent material having flexibility and, for example, can be configured with polyesters such as polyethylene terephthalate (PET) and polyethylene naphthalate (PEN), polyolefins such as polyethylene (PE), polypropylene (PP), polystyrene, ethylene vinyl acetate (EVA), a cycloolefin polymer (COP), and a cycloolefin copolymer (COC), a vinyl resin, polycarbonate (PC), polyamide, polyimide, an acrylic resin, or triacetyl cellulose (TAC). It is preferable that the support 1 is configured with polyethylene terephthalate, from a viewpoint of light transmittance, thermal shrinkability, and workability.

When the support 1 has a thickness smaller than 80 streak-like wrinkles W are easily generated in annealing treatment shown below, when the support has a thickness equal to or smaller than 50 μm, the streak-like wrinkles W are more easily generated, and when the support has a thickness equal to or smaller than 38 μM, the streak-like wrinkles W are even more easily generated.

The lower limit value of the thickness of the support 1 is not particularly limited, as long as a mesh pattern formed of thin metal wires can be formed on the surface thereof and the roll transportation can be performed using the plurality of pass rollers, and thus, the lower limit value thereof may be suitably set in accordance with the strength of the support and the like.

The support 1 is transported to the pass roller 4 which is disposed on an upstream side of the heater 7 in a machine direction (MD direction) of the support 1 and is introduced into the heater 7. An annealing treatment chamber N held at a temperature equal to or lower than a temperature obtained by adding 35° C. to a dynamic glass transition temperature of the support 1 is formed in the heater 7 and the annealing treatment is performed with respect to the support 1 transported to the annealing treatment chamber N.

By performing the annealing treatment with respect to the support 1 as described above, the support 1 has low thermal shrinkage, and the support 1 having a thickness smaller than 80 μm can be set to have a predetermined thermal shrinkage.

Figure 11:
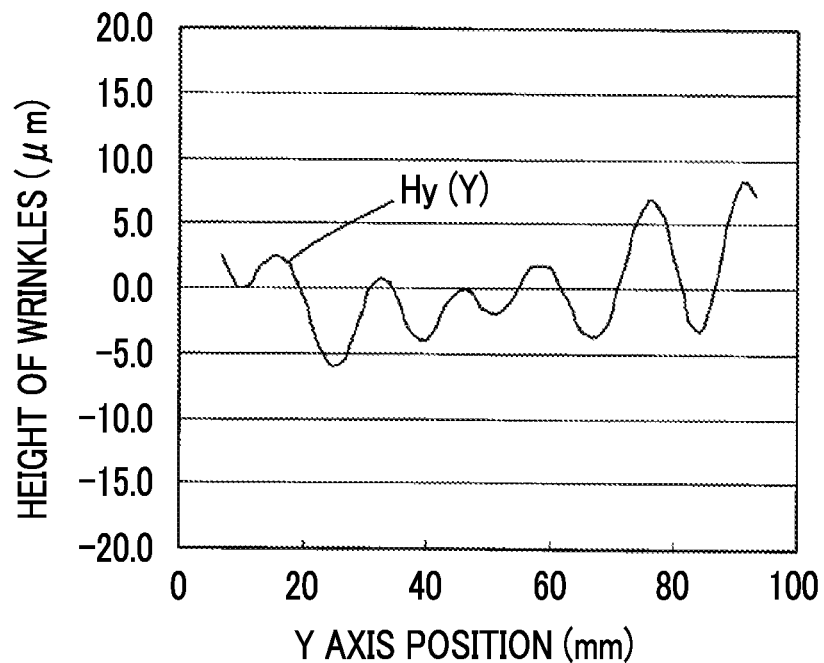
FIG. 11 is a graph showing a change in height of streak-like wrinkles with respect to Y axis positions.
Figure 12:
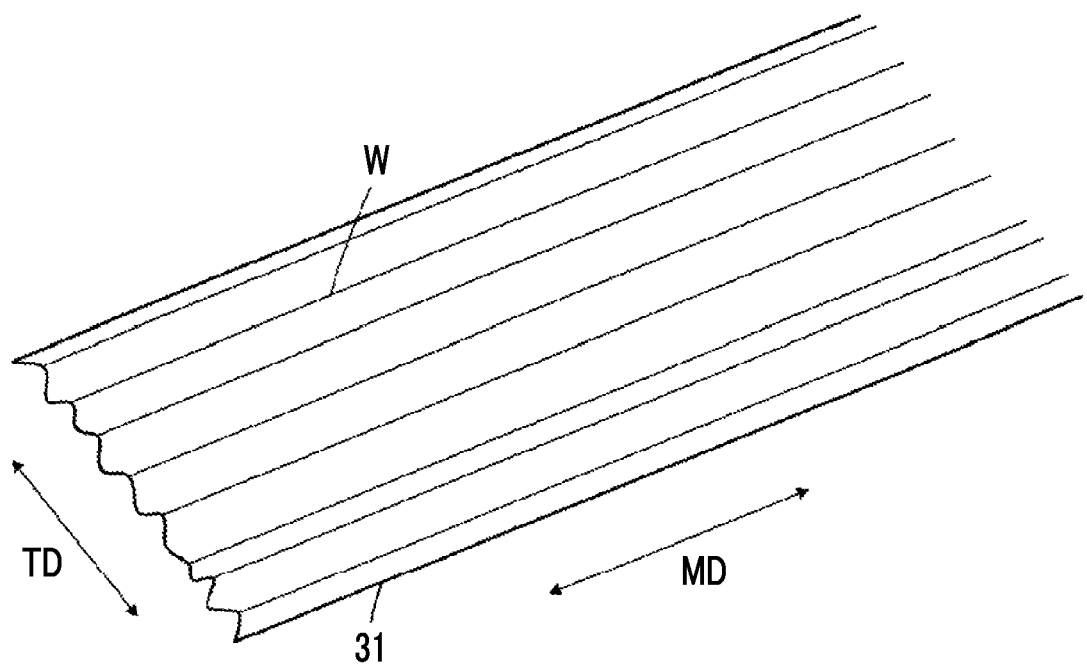
FIG. 12 is a plan view showing a plurality of streak-like wrinkles generated on the support due to annealing treatment.
Figure 13:
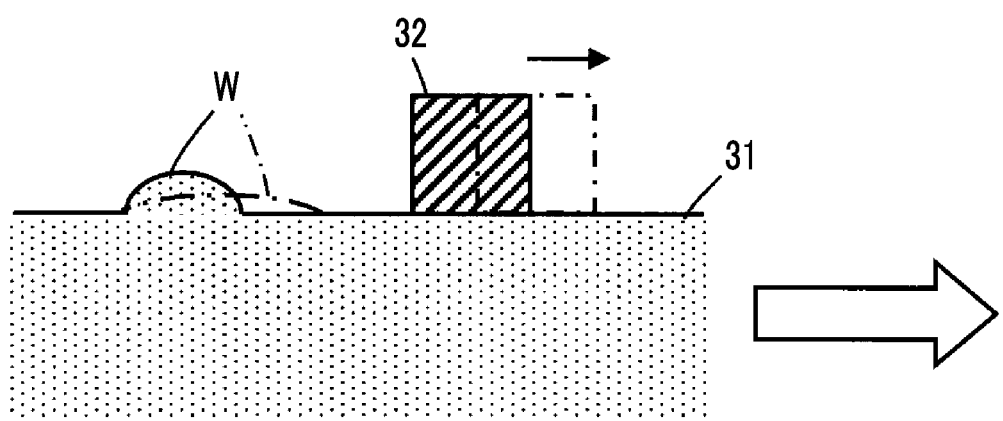
FIG. 13 is a cross section showing a state where a position of a thin metal wire formed on a support is deviated due to smoothing of a streak-like wrinkle.

At this time, when the annealing treatment is performed at a temperature higher than a temperature obtained by adding 35° C. to a dynamic glass transition temperature of the support 1, the support 1 becomes excessively soft and a rigidity thereof as a film significantly decreases. Accordingly, wrinkles are strongly generated on the support 1 during the roll transportation, and when cooling the support after the annealing treatment, the wrinkle shape of the support 1 is fixed and great streak-like wrinkles W are generated on the support 1, as shown in FIG. 11. Therefore, when the temperature of the annealing treatment of the support 1 is set as a temperature equal to or lower than a temperature obtained by adding 35° C. to a dynamic glass transition temperature of the support 1, it is possible to prevent an excessive decrease in rigidity of the support 1, and to reducing intensity of the wrinkles generated on the support 1 during the roll transportation to reduce intensity of the wrinkle shape fixed to the support 1 during the cooling after the annealing treatment. When dynamic viscoelasticity measurement (DMA) is performed using COSMOSHINE A4300 (manufactured by Toyobo Co., Ltd.) consisting of polyethylene terephthalate, a dynamic glass transition temperature is 115° C. and an annealing treatment temperature can be set to be equal to or lower than 150° C.

Meanwhile, generally, in the support 1 formed of PET or the like, thermal shrinkage occurs at a temperature higher than the static glass transition temperature, but a rate of thermal shrinkage is low at a temperature lower than the dynamic glass transition temperature, and it is necessary to extent the annealing time for causing thermal shrinkage until predetermined thermal shrinkage is obtained. Accordingly, it is not preferable to perform the annealing at a low temperature from production efficiency, because a speed of the annealing treatment is significantly decreased. Thus, it is preferable to perform the annealing treatment at a temperature equal to or higher than a temperature lower than the dynamic glass transition temperature by 10° C. (dynamic glass transition temperature—10° C.).

That is, the range of the annealing treatment temperature is preferably a temperature range from a temperature lower than the dynamic glass transition temperature by 10° C. to a temperature higher than the dynamic glass transition temperature by 35° C., because the rate of thermal shrinkage is increased at a temperature higher than the dynamic glass transition temperature.

Here, the annealing treatment temperature is more preferably set to be equal to or lower than a temperature obtained by adding 25° C. to the dynamic glass transition temperature of the support 1 and even more preferably set to be equal to or lower than a temperature obtained by adding 15° C. to the dynamic glass transition temperature of the support 1.

As described above, by performing the annealing treatment with respect to the support 1 at a temperature equal to or lower than the temperature obtained by adding 35° C. to the dynamic glass transition temperature of the support 1, it is possible to obtain the support 1 having a ten-point average roughness (Rz) of a surface ruggedness shape equal to or smaller than 6.1 μm. Here, the ten-point average roughness of a surface ruggedness shape is calculated by using a measurement method of a surface ruggedness shape which will be described later.

By performing the annealing treatment, it is possible to obtain the support 1 in which an absolute value of thermal shrinkage in the MD direction is within 0.6% and an absolute value of thermal shrinkage in a transverse direction (TD direction) orthogonal to the MD direction is within 0.2%. Here, the thermal shrinkage of the support 1 is calculated by an evaluation method of thermal shrinkage which will be described later.

The support 1 subjected to the annealing treatment is drawn from the heater 7 and transported by the pass rollers 5 and 6.

At this time, it is preferable that, the support 1 is transported at a temperature equal to or higher than the static glass transition temperature and lower than the dynamic glass transition temperature of the support 1, after performing the annealing treatment with respect to the support 1 and until the support reaches the pass roller 5 which is the first roller, and the temperature of the support 1 is decreased to a temperature lower than the static glass transition temperature between the pass roller 5 which is the first roller and the pass roller 6 which is the second roller.

Specifically, the support 1 is transported at a temperature equal to or higher than the static glass transition temperature and lower than the dynamic glass transition temperature of the support 1 in a section L1 between the annealing treatment chamber N of the heater 7 and the pass roller 5. Since the distance between the pass roller 4 and the pass roller 5 is long, the streak-like wrinkles W may be generated on the support 1, even when the temperature of the annealing treatment is set to be a temperature equal to or lower than the temperature obtained by adding 35° C. to the dynamic glass transition temperature of the support 1 as described above. Therefore, even when the streak-like wrinkles W are generated on the support 1 by holding the support at a temperature equal to or higher than the static glass transition temperature and lower than the dynamic glass transition temperature in the section L1, it is possible to prevent the fixation of the streak-like wrinkles W onto the support 1 by decreasing the temperature of the support 1 to a temperature lower than the static glass transition temperature. The temperature in the section L1 may be controlled by adjusting an atmosphere temperature at which the support 1 is transported or may be adjusted by heating the support 1 using a heating device having a temperature control function.

When the temperature of the pass roller 5 is set to be equal to or lower than the static glass transition temperature of the support 1, the streak-like wrinkles W are fixed when the support 1 comes into contact with the pass roller 5, even when the temperature in the section 1 is controlled as described above. Thus, it is preferable that the pass roller 5 is held at a temperature equal to or higher than the static glass transition temperature and lower than the dynamic glass transition temperature of the support 1. The streak-like wrinkles W generated on the support 1 are sequentially smoothed using the pass roller 5 which is subjected to the temperature control as described above and it is possible to form a smooth support 1 without wrinkles W.

The temperature of the support 1 is decreased to a temperature lower than the static glass transition temperature of the support 1 in a section L2 between the pass roller 5 and the pass roller 6. The length of the section L2 is preferably set within 30 cm so that a large number of streak-like wrinkles W are not generated on the support 1. Accordingly, the temperature of the support 1 which has passed the pass roller 5 is decreased to a temperature lower than the static glass transition temperature in a smooth state, and the shape of the support 1 can be fixed to a smooth state by the pass roller 6 having a temperature set as the temperature lower than the static glass transition temperature. It is preferable that the section L2 between the adjacent pass rollers 5 and 6 is set so that the rollers are disposed at a narrow interval, but it is necessary to dispose the rollers so that both pass rollers at least do not interfere with each other. Thus, in a case where diameters of both pass rollers are equivalent, the interval therebetween is preferably greater than the diameter thereof. In a case where diameters of both pass rollers are different from each other, the interval is preferably greater than the sum of radii thereof.

Here, the interval between the pass roller 5 and the pass roller 6 is more preferably within 20 cm and accordingly, it is possible to further prevent streak-like wrinkles W generated on the support 1.

The support 1 is fixed to be in a smooth state in the section L2 between the pass roller 5 and the pass roller 6 as described above, and thus, it is possible to obtain the support 1 having a ten-point average roughness (Rz) of a surface ruggedness shape equal to or smaller than 4.5 μm. Here, the ten-point average roughness of the surface ruggedness shape is calculated by using a measurement method of a surface ruggedness shape which will be described later.

Thus, the smoothed support 1 passes through the pass roller 6 and is transported towards the winding roller 3.

(Formation Method of Mesh Pattern)

Figure 2:
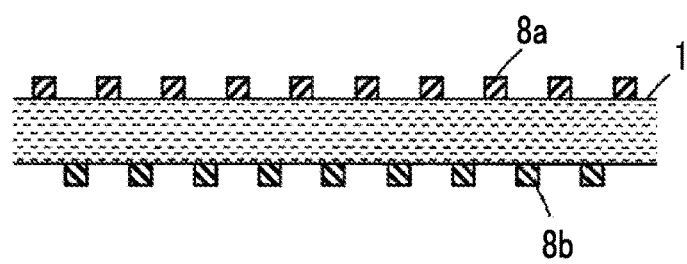
FIG. 2 is a cross section showing a state where a plurality of thin metal wires are formed on a support.
Figure 3:
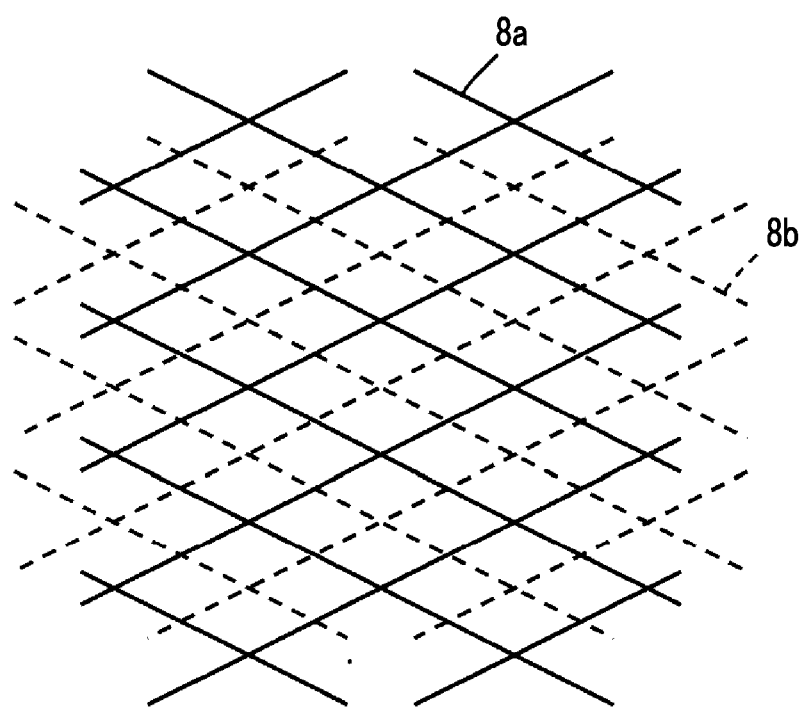
FIG. 3 is a plan view showing a mesh pattern formed of thin metal wires.

Then, after being wound around the winding roller 3 or during being transported towards the winding roller 3, a plurality of thin metal wires 8a are formed on a front surface of the support 1 and a plurality of thin metal wires 8b are formed on a rear surface of the support 1, as shown in FIG. 2. Accordingly, as shown in FIG. 3, a mesh pattern formed of the thin metal wires 8a and 8b is formed on the front surface and the rear surface of the support 1.

Figure 4:
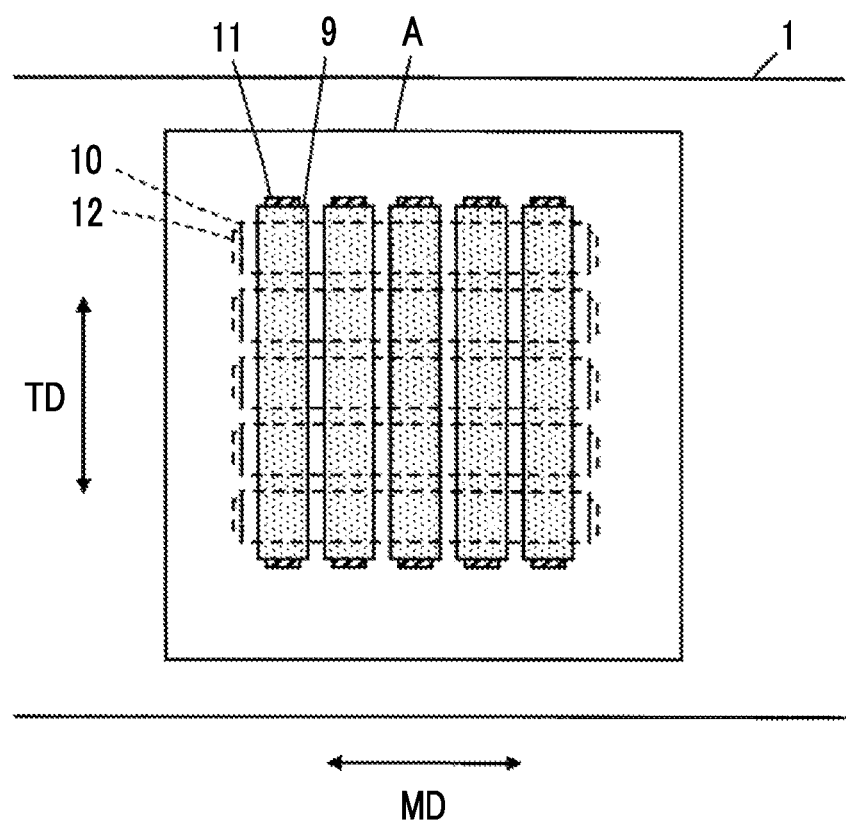
FIG. 4 is a plan view showing a state where a plurality of mesh electrodes are formed on the support.

Thus, as shown in FIG. 4, a plurality of first mesh electrodes 9 formed of the thin metal wires 8a are formed on the front surface of the support 1 and a plurality of second mesh electrodes 10 formed of the thin metal wires 8b are formed on the rear surface of the support 1. Here, the first mesh electrodes 9 are respectively formed so as to extend along the TD direction and to be disposed in parallel to the MD direction in a film formation area A, and the second mesh electrodes 10 are respectively formed so as to extend along the MD direction and to be disposed in parallel to the TD direction in the film formation area A.

Here, a formation method of the first mesh electrodes 9 and the second mesh electrodes 10 is not particularly limited, and methods disclosed in JP2011-129501A, JP2013-149236A, and JP2014-112512A can be used, for example.

The first mesh electrodes 9 and the second mesh electrodes 10, for example, can be formed by respectively applying a photosensitive material including an emulsion layer containing photosensitive silver halide salt to the front surface and the rear surface of the support 1 and exposing the photosensitive material applied to the support 1 to light to perform a development process. The first mesh electrodes 9 and the second mesh electrodes 10 can also be respectively formed by forming a metal foil on the front surface and the rear surface of the support 1, performing printing or entire-surface applying of a resist in a pattern shape on each metal foil, exposing and developing this resist for patterning, and etching the metal of an opening formed by the patterning. In addition, the first mesh electrodes 9 and the second mesh electrodes 10 can also be respectively formed by a method of printing a paste containing fine particles of an electrode material and performing metal plating with respect to the paste, and a method using an ink jet method using ink containing fine particles of an electrode material.

A width of each of the thin metal wires 8a and 8b is preferably smaller than 7 μm and more preferably equal to or smaller than 5 μm, from a viewpoint of visibility.

The thin metal wires 8a and 8b, for example, can be configured with materials such as indium tin oxide (ITO), gold (Au), silver (Ag), and copper (Cu). The thin metal wires 8a and 8b preferably include a binder component, in order to improve bending resistance. As the binder component, a material disclosed in JP2013-149236A can be used, for example.

Figure 5:
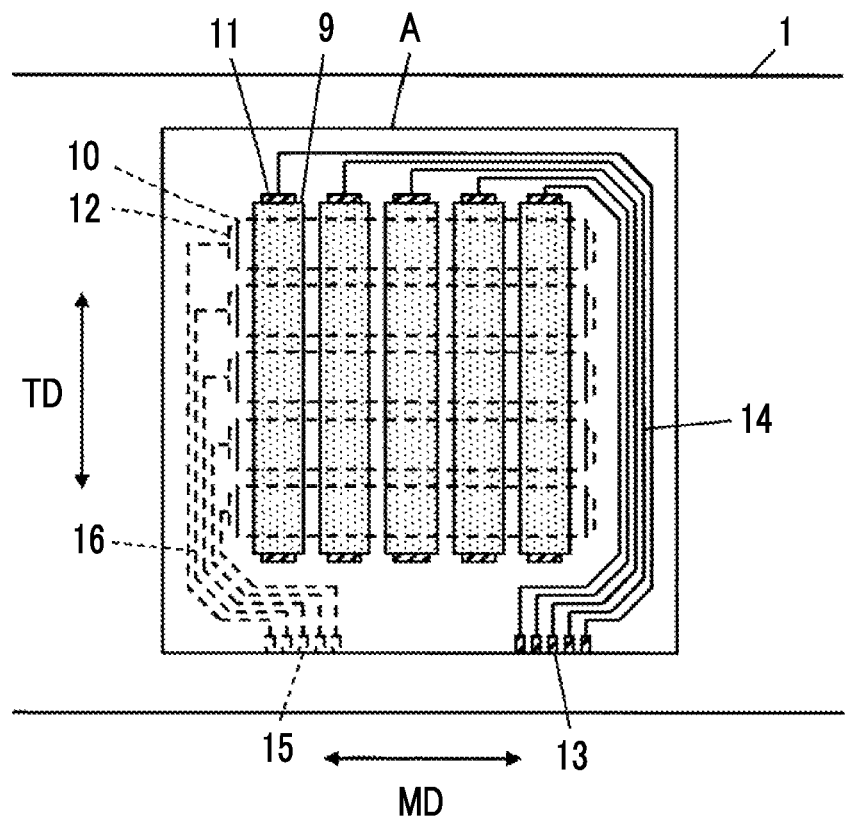
FIG. 5 is a plan view showing a state where external connection terminals and peripheral wirings are formed on the support.

Then, first connector units 11 are formed on both ends of each first mesh electrode 9 and second connector units 12 are formed on both ends of each second mesh electrode 10. As shown in FIG. 5, a first external connection terminal 13 corresponding to one of the first connector units 11 formed on both ends of the first mesh electrode 9 is formed and first peripheral wirings 14 connecting the one first connector units 11 and the first external connection terminals 13 corresponding thereto to each other are formed in the film formation area A on the front surface of the support 1.

In the same manner as described above, a second external connection terminal 15 corresponding to one of the second connector units 12 formed on both ends of the second mesh electrode 10 is formed and second peripheral wirings 16 connecting the one second connector units 12 and the second external connection terminals 15 corresponding thereto to each other are formed in the film formation area A on the rear surface of the support 1.

Here, the first connector units 11, the first external connection terminals 13, and the first peripheral wirings 14 can be formed using the same method as that used for the first mesh electrodes 9 and may be formed at the same time as the formation of the first mesh electrodes 9. In the same manner as described above, the second connector units 12, the second external connection terminals 15, and the second peripheral wirings 16 can be formed using the same method as that used for the second mesh electrodes 10 and may be formed at the same time as the formation of the second mesh electrodes 10.

It is possible to obtain a touch sensor film by performing the cutting along the film formation area A. When the support 1 is subjected to the annealing treatment at a temperature equal to or lower than a temperature obtained by adding 35° C. to a dynamic glass transition temperature of the support 1 as described above, it is possible to prevent the plurality of streak-like wrinkles W generated on the support 1 and to prevent a position deviation of the mesh electrodes accompanied therewith to prevent occurrence of moire.

Figure 6:
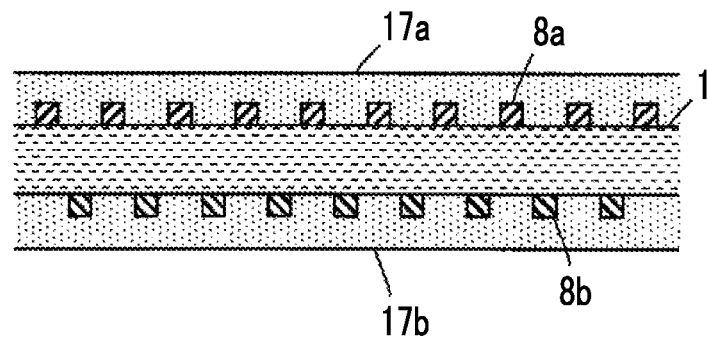
FIG. 6 is a cross section showing a touch sensor film in which protective layers are formed.

As shown in FIG. 6, it is preferable that protective layers 17a and 17b are respectively formed on the front surface and the rear surface of the touch sensor film. Here, the protective layers 17a and 17b are for protecting conductive portions of the first mesh electrodes 9 and the second mesh electrodes 10 and can be configured with, for example, glass, polycarbonate (PC), polyethylene terephthalate (PET), and the like. A hard coat layer and an antireflection layer can also be provided on the surfaces of the protective layers 17a and 17b.

[Touch Sensor Film]

According to the invention, there is provided a touch sensor film including: a transparent support having a thickness smaller than 80 μm; and mesh electrodes which are disposed on surfaces of the support and have a mesh pattern formed of thin metal wires, in which, in the support, an absolute value of thermal shrinkage in the MD direction is within 0.6%, an absolute value of thermal shrinkage in the TD direction is within 0.2%, and a ten-point average roughness of a surface ruggedness shape is equal to or smaller than 6.1 μm.

Figure 7:
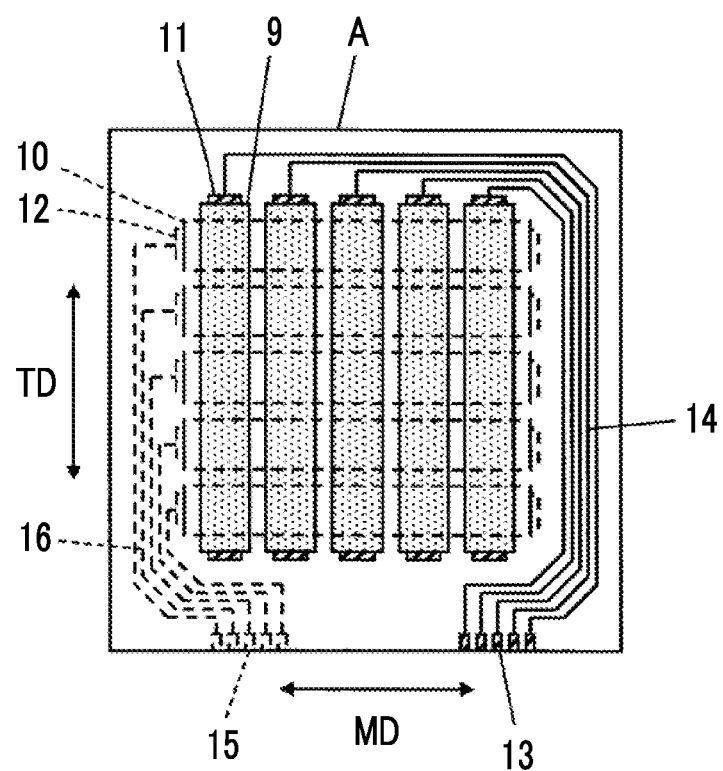
FIG. 7 is a plan view showing a touch sensor film according to this invention.

FIG. 7 shows an example of a touch sensor film. This touch sensor film is obtained by using the manufacturing method of the touch sensor film described above, and includes the rectangular transparent support 1 having flexibility. As described above, the first mesh electrodes 9, the first connector units 11, the first external connection terminals 13, and the first peripheral wirings 14 are disposed on the front surface of the support 1, and the second mesh electrodes 10, the second connector units 12, the second external connection terminals 15, and the second peripheral wirings 16 are disposed on the rear surface of the support 1.

Here, since the support 1 is subjected to the annealing treatment at a temperature equal to or lower than a temperature obtained by adding 35° C. to a dynamic glass transition temperature of the support 1, the support is formed in that an absolute value of thermal shrinkage in the MD direction is within 0.6%, an absolute value of thermal shrinkage in the TD direction is within 0.2%, and a ten-point average roughness (Rz) of a surface ruggedness shape is equal to or smaller than 6.1 μm.

When the absolute value of thermal shrinkage of the support 1 in the MD direction is set to be within 0.6%, the absolute value of thermal shrinkage in the TD direction is set to be within 0.2%, and the ten-point average roughness (Rz) of the surface ruggedness shape is set to be equal to or smaller than 6.1 μm as described above, it is possible to prevent the plurality of streak-like wrinkles W generated on the support 1. Accordingly, it is possible to prevent a position deviation of the mesh electrodes of the touch sensor film and prevent occurrence of moire.

The ten-point average roughness (Rz) of the surface ruggedness shape of the support 1 is preferably equal to or smaller than 4.5 μm.

[Touch Panel]

Next, a touch panel according to the invention will be described in detail.

Figure 8:
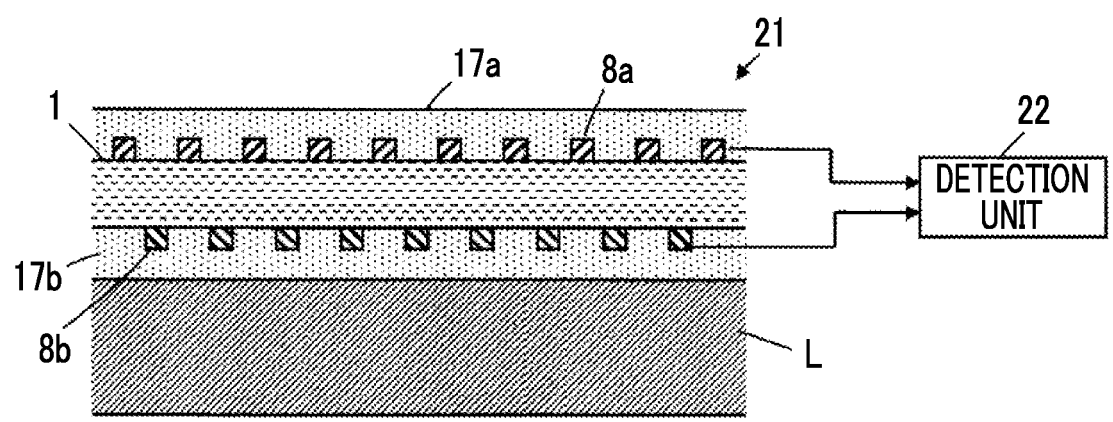
FIG. 8 is a cross section showing the touch panel according to this invention.

The touch panel includes the touch sensor film described above, and is, for example, configured with a touch sensor film 21 in which the protective layers 17a and 17b are formed, and a detection unit 22 which is connected to the first mesh electrodes 9 and the second mesh electrodes 10 of the touch sensor film 21 through the first external connection terminals 13 and the second external connection terminals 15, as shown in FIG. 8, and the touch panel is used by attaching a display device L to the rear surface side of the touch sensor film 21.

The detection unit 22 is configured with an electronic circuit which senses a change in electrostatic capacity to detect a contact position, when a finger comes into contact with the touch sensor film 21.

The display device L displays a color image and a monochrome image and is, for example, configured with a liquid crystal display. The touch sensor film 21 is attached to the display device L in a stretched state, and accordingly, when the plurality of streak-like wrinkles W are generated on the support 1 of the touch sensor film 21, a position deviation of the first mesh electrodes 9 and the second mesh electrodes 10 occurs. In the touch sensor film 21 of the invention, the support 1 is formed so that the ten-point average roughness (Rz) of a surface ruggedness shape of the support is equal to or smaller than 6.1 μm, and the plurality of streak-like wrinkles W generated on the support 1 are prevented. Accordingly, a position deviation of the first mesh electrodes 9 and the second mesh electrodes 10 is prevented and it is possible to prevent occurrence of moire in the touch panel.

EXAMPLES

Hereinafter, the invention will be described in detail with reference to the examples. The materials, the usage amount, the ratio, the process content, and the process procedure shown in the following examples can be suitably changed within a range not departing from the gist of the invention. Therefore, the ranges of the invention are not narrowly interpreted based on the examples shown below.

Example 1

<Annealing Treatment of Support>

As the support, an elongated sheet (COSMOSHINE A4300, manufactured by Toyobo Co., Ltd.) which is formed of polyethylene terephthalate (PET), has a dynamic glass transition temperature of 115° C., and has a thickness of 75 μm was used. As shown in FIG. 1, the support was transported and subjected to the annealing treatment by a transportation device in which the delivery roller 2, the pass roller 4 before a drying furnace, the drying furnace (heater) 7, a first pass roller 5 after the drying furnace, and the second pass roller 6 after the drying furnace are sequentially disposed.

More specifically, the support was subjected to the annealing treatment for 10 seconds to 30 seconds in the drying furnace 7 including the annealing treatment chamber N having an entire length of 16 m set to 150° C. while transporting the support at a rate of 60 m/min. At this time, the support was transported at a tension of 40 N/m in the section between the pass roller 4 and the pass roller 5. Then, the support was transported in the sections L1 and L2 held at room temperature by the pass rollers 5 and 6. At this time, the temperature of the support immediately before the support arrives the pass roller 5 (that is, the section L1) was measured and the temperature thereof which is lower than 75° C. which is the static glass transition temperature of the support was confirmed. The pass rollers 5 and 6 are installed so that the distance of the section L1 becomes 1 m and the distance of the section L2 becomes 50 cm, without the temperature control.

After performing the annealing treatment with respect to the support as described above, both surfaces thereof were subjected to surface hydrophilizing by corona discharge treatment. FIG. 1 shows minimum functional parts for performing the annealing treatment with respect to the support, and in practice, functional parts having other functions such as a coating function and other pass rollers can be incorporated. In Examples 2 to 28 which will be described later, the tension applied to the support and the transportation rate thereof between the pass roller 4 and the pass roller 5 were adjusted at a suitable time to the conditions in which the surface state of the support after the annealing treatment becomes an optimal state.

<Formation of Mesh Electrodes>

(Preparation of Silver Halide Emulsion)

Amounts of a 2 solution and a 3 solution below corresponding to 90% were added to a 1 solution below held at 38° C. and pH of 4.5 for 20 minutes while being stirring, and nuclear particles having a diameter of 0.16 μm were formed. Then, a 4 solution and a 5 solution below were added thereto for 8 minutes, and the amounts of the remaining 10% of the 2 solution and the 3 solution below were added thereto for 2 minutes, and the particles were caused to grow to have a diameter of 0.21 μm. 0.15 g of potassium iodide was added thereto, aging was performed for 5 minutes, and particle formation was finished.

1 solution:
Water: 750 ml
Gelatin: 9 g
Sodium chloride: 3 g
1,3-dimethyl-2-thione: 20 mg
Sodium benzenethiosulfonate: 10 mg
Citric acid: 0.7 g
2 solution:
Water: 300 ml
Silver nitrate: 150 g
3 solution:
Water: 300 ml
Sodium chloride: 38 g
Potassium bromide: 32 g
Potassium hexachloroiridate (III) (0.005% of KCl and 20% of aqueous solution): 8 ml
Ammonium hexachlorinated rhodiumate (0.001% of NaCl and 20% of aqueous solution): 10 ml
4 solution:
Water: 100 ml
Silver nitrate: 50 g
5 solution:
Water: 100 ml
Sodium chloride: 13 g
Potassium bromide: 11 g
Yellow prussiate of potash: 5 mg After that, washing was performed using a flocculation method according to the usual method. Specifically, the temperature was decreased to 35° C. and pH was decreased using sulfuric acid until silver halide is precipitated (pH was in a range of 3.6±0.2). Then, approximately 3 liters of the supernatant was removed (first washing). After adding 3 liters of distilled water, sulfuric acid was added until silver halide is precipitated. 3 liters of the supernatant was removed again (second washing). The same operation as the second washing was further repeated one more time (third washing) and a washing and desalting step was finished. The pH of the emulsion after washing and desalting was adjusted to 6.4 and the pAg thereof was adjusted to 7.5, 3.9 g of gelatin, 10 mg of sodium benzenethiosulfonate, 3 mg of sodium benzenethiosulfinate, 15 mg of sodium thiosulfate, and 10 mg of chloroauric acid were added thereto, chemo-sensitization was performed so as to obtain optimal sensitivity at 55° C., 100 mg of 1,3,3a,7-tetraazaindene as a stabilizer and 100 mg of PROXEL (product name, manufactured by ICI Co., Ltd.) as a preservative were added thereto. The emulsion finally obtained was a iodide salt silver bromide cubic grain emulsion containing 0.08 mol % of silver iodide, in which a proportion of silver chlorobromide was set so that a proportion of silver chloride is 70 mol % and a proportion of silver bromide is 30 mol %, an average particle diameter is 0.22 μm, and a coefficient of variation is 9%.

(Preparation of Composition for Forming Photosensitive Layer)

$1.2 \times 10^{-4}$ mol/mol Ag of 1,3,3a,7-tetraazaindene, $1.2 \times 10^{-2}$ mol/mol Ag of hydroquinone, $3.0 \times 10^{-4}$ mol/mol Ag of citric acid, and 0.90 g/mol Ag of 2,4-dichloro-6-hydroxy-1,3,5-triazine sodium salt were added to the emulsion described above, the pH of the coating solution was adjusted to 5.6 using citric acid, and a composition for forming a photosensitive layer was obtained.

(Photosensitive Layer Formation Step)

A gelatin layer having a thickness of 0.1 μm as an undercoat was provided on both surfaces of the support subjected to the annealing treatment, and an antihalation layer containing a dye which has an optical density of approximately 1.0 and is decolored due to alkali of a developer was further provided on the undercoat. The composition for forming a photosensitive layer was applied onto the antihalation layer, a gelatin layer having a thickness of 0.15 μm was further provided, and the support including photosensitive layers formed on both surfaces thereof was obtained. The support including photosensitive layers formed on both surfaces thereof is set as a film A. Regarding the photosensitive layers formed, an amount of silver was 6.0 g/m² and an amount of gelatin was 1.0 g/m².

(Exposure and Development Step)

The exposure of both surfaces of the film A was performed using parallel light using a high pressure mercury lamp as a light source through a photo mask corresponding to the electrode pattern of FIG. 4 described above. After the exposure, the development was performed using a developer below and a fixing process was performed using a fixing solution (product name: N3X-R for CN16X manufactured by Fujifilm Corporation). Then, the support was rinsed with pure water and dried, and accordingly, a support in which an electrode pattern formed of thin Ag wires and gelatin layers are formed on both surfaces was obtained. The gelatin layers were formed between the thin Ag wires. The film obtained was set as a film B.

(Composition of Developer)

The following compounds are included in 1 liter (L) of the developer.

Hydroquinone: 0.037 mol/L
N-methylaminophenol: 0.016 mol/L
Sodium metaborate: 0.140 mol/L
Sodium hydroxide: 0.360 mol/L
Sodium bromide: 0.031 mol/L
Potassium metabisulfite: 0.187 mol/L (Heating Step)

The film B was placed in a superheated vapor tank at 120° C. for 130 seconds to perform the heating process. The film after the heating process was set as a film C.

(Gelatin Decomposing Process)

The film C was dipped in an aqueous solution of a proteolytic enzyme (BIOPLASE AL-15FG manufactured by Nagase ChemteX Corporation) (concentration of proteolytic enzyme: 0.5% by mass, solution temperature: 40° C.) for 120 seconds. The film C was extracted from the aqueous solution and dipped in warm water (solution temperature: 50° C.) for 120 seconds, and then washed. The film after the gelatin decomposing process was set as a film D. The film D was set as a touch sensor film.

Example 2

A touch sensor film was manufactured by the same method as that in Example 1, except for setting the temperature of the drying furnace as 140° C. in the annealing treatment of the support.

Example 3

A touch sensor film was manufactured by the same method as that in Example 1, except for setting the temperature of the drying furnace as 130° C. in the annealing treatment of the support.

Example 4

A touch sensor film was manufactured by the same method as that in Example 1, except for using a support having a thickness of 50 μm.

Example 5

A touch sensor film was manufactured by the same method as that in Example 4, except for setting the temperature of the drying furnace as 140° C. in the annealing treatment of the support.

Example 6

A touch sensor film was manufactured by the same method as that in Example 4, except for setting the temperature of the drying furnace as 130° C. in the annealing treatment of the support.

Example 7

A touch sensor film was manufactured by the same method as that in Example 1, except for using a support having a thickness of 38 μm.

Example 8

A touch sensor film was manufactured by the same method as that in Example 7, except for setting the temperature of the drying furnace as 140° C. in the annealing treatment of the support.

Example 9

A touch sensor film was manufactured by the same method as that in Example 7, except for setting the temperature of the drying furnace as 130° C. in the annealing treatment of the support.

Example 10

A touch sensor film was manufactured by the same method as that in Example 1, except for using a support having a thickness of 25 μm.

Example 11

A touch sensor film was manufactured by the same method as that in Example 10, except for setting the temperature of the drying furnace as 140° C. in the annealing treatment of the support.

Example 12

A touch sensor film was manufactured by the same method as that in Example 10, except for setting the temperature of the drying furnace as 130° C. in the annealing treatment of the support.

Example 13

When differential scanning calorimetry (DSC) and dynamic viscoelasticity measurement (DMA) were performed using the following method, regarding an elongated sheet (COSMOSHINE A4300, manufactured by Toyobo Co., Ltd.) which is formed of polyethylene terephthalate (PET), has a dynamic glass transition temperature of 115° C., and has a thickness of 75 μm used as the support, a static glass transition temperature was 75° C. and a dynamic glass transition temperature was 115° C. Then, a touch sensor film was manufactured by the same method as that in Example 1, except for transporting the support at a temperature equal to or higher than the static glass transition temperature (75° C.) and lower than the dynamic glass transition temperature (115° C.) after the support has passed through the drying furnace 7 and until the support reaches the pass roller 5 which is the first roller, and decreasing the temperature of the support to a temperature lower than the static glass transition temperature (75° C.) between the pass roller 5 which is the first roller and the pass roller 6 which is the second roller, in the annealing treatment of the support. When performing the annealing treatment under the conditions described above, a temperature control environment is provided in the section L1 and the section L2 and the temperature was controlled so as to have the temperature history described above.

Figure 9:
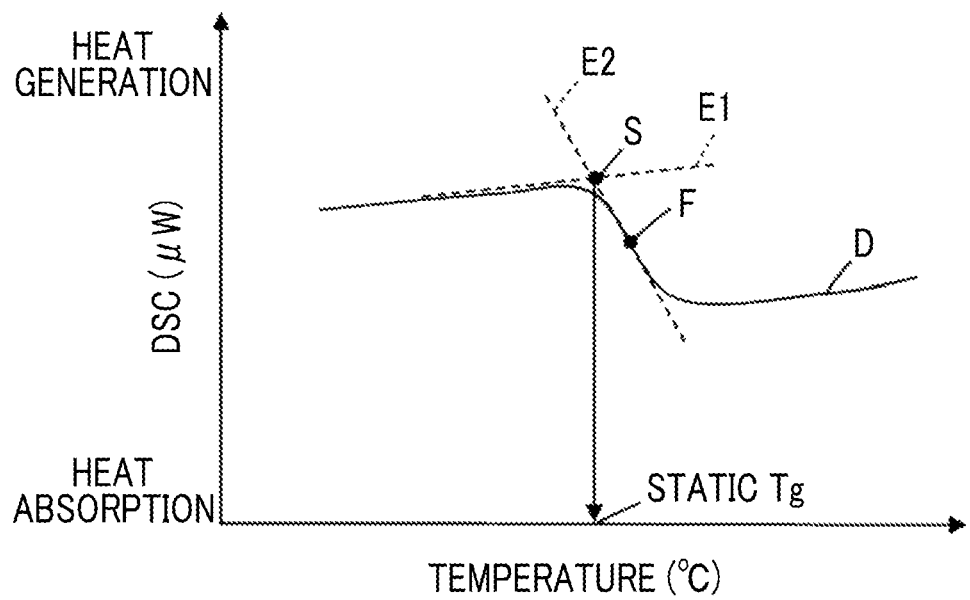
FIG. 9 is a graph showing a calculation method of a static glass transition temperature.

The measurement of DSC was performed using DSC7200 or the like manufactured by SII Nanotechnology Inc. As the measurement conditions, temperature of the support was increased from 25° C. to 300° C. at 10° C./1 min, then, the temperature of the support was held at 300° C. for 10 minutes, decreased from 300° C. to −50° C. at −50° C./1 min, and the temperature of the support was held at −50° C. for 10 minutes. Then, the temperature of the support was increased from −50° C. to 300° C. at 10° C./1 min, and differential calories (DSC) of the support at this time were measured at intervals of 0.5 seconds. FIG. 9 shows a temperature dependence curve of DSC obtained by the measurement. As shown in FIG. 9, an inflection point F (point where a curve concave downward is changed to a curve concave upward) appears on the temperature dependence curve D in accordance with the temperature rising of the support. Then, an intersection point S between a base line E1 drawn so as to be tangent to the temperature dependence curve on the lower temperature side of the inflection point F, and a tangent E2 of the inflection point F was acquired, and the temperature corresponding to this intersection point S was set as a static glass transition temperature (static Tg).

The measurement of DMA was performed by stretching the support in a sine wave mode using DMS6200 or the like manufactured by SII Nanotechnology Inc. As the measurement conditions, the temperature of the support was increased from 25° C. to 220° C. at 5° C./1 min and the support was held at 220° C. for 5 minutes. The stress applied to the support was set as 1 Hz and the measurement data was sampled every 30 seconds. As measurement results, a storage modulus, a loss modulus, and temperature dependency of tan δ (=loss modulus/storage modulus) were obtained. A peak temperature when tan δ forms a curve concave downward was set as a dynamic glass transition temperature (dynamic Tg).

Example 14

A touch sensor film was manufactured by the same method as that in Example 13, except for using a support having a thickness of 50 μm.

Example 15

A touch sensor film was manufactured by the same method as that in Example 13, except for using a support having a thickness of 38 μm.

Example 16

A touch sensor film was manufactured by the same method as that in Example 13, except for using a support having a thickness of 25 µm.

Example 17

A touch sensor film was manufactured by the same method as that in Example 13, except for setting the temperature of the drying furnace as 140° C. in the annealing treatment of the support.

Example 18

A touch sensor film was manufactured by the same method as that in Example 14, except for setting the temperature of the drying furnace as 140° C. in the annealing treatment of the support.

Example 19

A touch sensor film was manufactured by the same method as that in Example 15, except for setting the temperature of the drying furnace as 140° C. in the annealing treatment of the support.

Example 20

A touch sensor film was manufactured by the same method as that in Example 16, except for setting the temperature of the drying furnace as 140° C. in the annealing treatment of the support.

Example 21

A touch sensor film was manufactured by the same method as that in Example 13, except for setting the interval between the pass roller 5 and the pass roller 6 of the transportation device as 20 cm in the annealing treatment of the support.

Example 22

A touch sensor film was manufactured by the same method as that in Example 21, except for using a support having a thickness of 50 µm.

Example 23

A touch sensor film was manufactured by the same method as that in Example 21, except for using a support having a thickness of 38 µm.

Example 24

A touch sensor film was manufactured by the same method as that in Example 21, except for using a support having a thickness of 25 µm.

Example 25

A touch sensor film was manufactured by the same method as that in Example 21, except for setting the temperature of the drying furnace as 140° C. in the annealing treatment of the support.

Example 26

A touch sensor film was manufactured by the same method as that in Example 22, except for setting the temperature of the drying furnace as 140° C. in the annealing treatment of the support.

Example 27

A touch sensor film was manufactured by the same method as that in Example 23, except for setting the temperature of the drying furnace as 140° C. in the annealing treatment of the support.

Example 28

A touch sensor film was manufactured by the same method as that in Example 24, except for setting the temperature of the drying furnace as 140° C. in the annealing treatment of the support.

Comparative Example 1

A touch sensor film was manufactured by the same method as that in Example 1, except for setting the temperature of the drying furnace as 170° C. in the annealing treatment of the support.

Comparative Example 2

A touch sensor film was manufactured by the same method as that in Example 1, except for setting the temperature of the drying furnace as 160° C. in the annealing treatment of the support.

Comparative Example 3

A touch sensor film was manufactured by the same method as that in Example 4, except for setting the temperature of the drying furnace as 170° C. in the annealing treatment of the support.

Comparative Example 4

A touch sensor film was manufactured by the same method as that in Example 4, except for setting the temperature of the drying furnace as 160° C. in the annealing treatment of the support.

Comparative Example 5

A touch sensor film was manufactured by the same method as that in Example 7, except for setting the temperature of the drying furnace as 170° C. in the annealing treatment of the support.

Comparative Example 6

A touch sensor film was manufactured by the same method as that in Example 7, except for setting the temperature of the drying furnace as 160° C. in the annealing treatment of the support.

Comparative Example 7

A touch sensor film was manufactured by the same method as that in Example 10, except for setting the temperature of the drying furnace as 170° C. in the annealing treatment of the support.

Comparative Example 8

A touch sensor film was manufactured by the same method as that in Example 10, except for setting the temperature of the drying furnace as 160° C. in the annealing treatment of the support.

<Evaluation Method>

(Measurement of Surface Ruggedness Shape) The touch sensor film was cut to have a size of 20 cm×20 cm and placed flat on a smooth measurement table so as not to generate wrinkles. At this time, the touch sensor film was placed flat on the measurement table without fixing edges or the like. Then, the height of the range of 10 cm×10 cm around the center of the touch sensor film was measured using a scanning type laser displacement meter (NAZCA-3D manufactured by MITANI Corporation), and thus, the surface ruggedness shape of the touch sensor film was quantified. Here, as the measurement conditions for the scanning type laser displacement meter, scanning directions were provided in two directions of an X axis and a Y axis orthogonal to each other, and a diameter of a laser beam was set as 0.07 mm, and a measurement pitch was set as 1 mm. An X axis direction was set in a direction along a plurality of streak-like wrinkles which are generated on the touch sensor film and extends in the MD direction, and the Y axis was set in a direction orthogonal to the plurality of streak-like wrinkles.

When a surface height measurement value at an arbitrary position $(X_i, Y_j)$ obtained as described above is set as $F(X_i, Y_j)$, an average value $F(Y_j)$ of the surface height measurement values $F(X_1, Y_j)$, $F(X_2, Y_j)$, ... $F(X_{Nx}, Y_j)$ on the X axis passing through the measurement point $Y_j$ is calculated based on the following Equation (1). Here, $N_x$ is a measurement point on the X axis and is 100 in this measurement.

$$F(Y_j) = \frac{1}{N_x} \sum_{i=1}^{N_x} F(X_i, Y_j) \tag{1}$$

Figure 10:
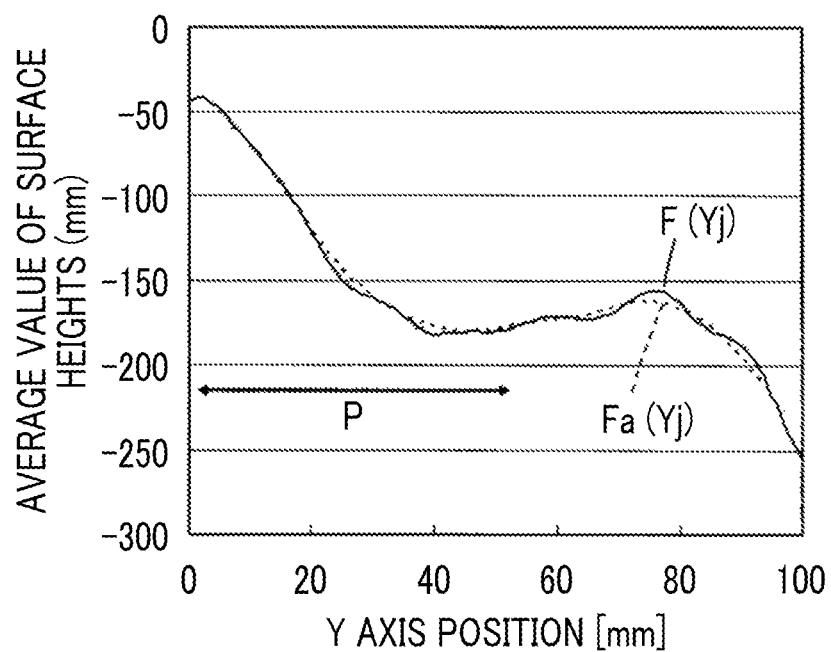
FIG. 10 is a graph showing a change in average value of a surface height with respect to Y axis positions.

By calculating the average values $F(Y_1)$, $F(Y_2)$, $F(Y_{100})$ of the surface heights described above regarding the measurement points $Y_1$, $Y_2$, $Y_{100}$ on the Y axis, an average change in surface heights in the Y axis direction can be obtained. FIG. 10 shows an example of a graph showing a change in average values $F(Y_j)$ of the surface heights with respect to the Y axis position. Here, the average value $F(Y_j)$ of the surface heights greatly changes vertically in a pitch P of approximately 50 mm, but this is a significant change generated in measurement values due to disturbance such as introduction of air between the measurement table and the touch sensor film, when the touch sensor film is placed flat on the measurement table, and the change thereof does not indicate the streak-like wrinkles W actually generated on the touch sensor film. Thus, a moving average process was performed in order to remove disturbance during the measurement.

Specifically, moving average values $Fa(Y_j)$ of previous seven measurement points and subsequent seven measurement points (measurement points present in a width of 15 mm) of the measurement points $Y_j$ on the Y axis is calculated. For example, in a case of acquiring the measurement point $Y_{10}$, a moving average values $Fa(Y_{10})$ of measurement points $Y_3$ to $Y_{17}$ is calculated based on the following Equation (2).

$$Fa(Y_j) = \frac{1}{15} \sum_{k=j-7}^{j+7} F(Y_k) \tag{2}$$

By calculating the moving average values $Fa(Y_7)$, $Fa(Y_8)$, $Fa(Y_{93})$ in a width of 15 mm regarding the measurement points of $Y_7$, $Y_2$, $Y_{93}$ on the Y axis, it is possible to extract only a significant change in surface heights due to disturbance. That is, by calculating the moving average value $Fa(Y_j)$ in a width of 15 mm including most of the width of the streak-like wrinkles W generated on the touch sensor film, a change of ruggedness caused by the streak-like wrinkles W is canceled out and it is possible to extract only a significant change in surface heights due to disturbance.

FIG. 10 shows an example of a graph showing a change in moving average value $Fa(Y_j)$ of the surface heights with respect to the Y axis position. By calculating a difference between the average value $F(Y_j)$ of the surface heights and the moving average value $Fa(Y_j)$ of the surface heights obtained as described above, a change in surface heights caused by the streak-like wrinkles W of the touch sensor film was extracted. FIG. 11 shows an example of a graph showing a displacement of a height Hy(Y) of the wrinkles W obtained by calculating a difference between the average value $F(Y_j)$ of the surface heights and the moving average value $Fa(Y_j)$ of the surface heights. Here, it is found that ruggedness caused by the streak-like wrinkles occurs at a pitch of 10 mm to 20 mm.

Then, by calculating the ten-point average roughness (Rz) of the surface ruggedness shape caused by the streak-like wrinkles W obtained, a degree of streak-like wrinkles W generated on the touch sensor film is acquired. Here, the ten-point average roughness Rz can be represented by the following Equation (3).

$$Rz = |Hyp1 + Hyp2 + Hyp3 + Hyp4 + Hyp5|/5 + |Hyv1 + Hyv2 + Hyv3 + Hyv4 + Hyv5| \tag{3}$$

Here, an average value V of heights of the wrinkles W obtained by averaging heights Hy(Y) of the wrinkles W of FIG. 11 in a predetermined reference range is calculated. The values from the highest value to the fifth highest value among the heights Hy(Y) of the wrinkles included in the reference range are shown as Hyp1 to Hyp5, and the values from the lowest value to the fifth lowest value are shown as Hyv1 to Hyv5.

The results are shown in the following Table 1 and Table 2.

(Evaluation of Thermal Shrinkage)

The touch sensor film was heated in a dry oven at 150° C. for 30 minutes in a flat-placed state, extracted from the dry oven, left at room temperature for 1 minute, and placed in an environment adjusted to have a temperature of 23° C. and humidity of 55% for 1 hour to control the humidity of the touch sensor film, and then, thermal shrinkage was measured by comparing dimensions before and after the heating treatment. Specifically, thermal shrinkage was respectively measured in the machine direction (MD direction) and the transverse direction (Td direction) of the support. Here, a low thermal shrinkage of the touch sensor film indicates high rigidity. It is practically necessary that an absolute value of thermal shrinkage in the MD direction is equal to or smaller than 0.6% and an absolute value of thermal shrinkage in the TD direction is equal to or smaller than 0.2%. The measurement of dimensions was performed by using a pin gauging method.

The results are shown in the following Table 1 and Table 2.

(Evaluation of Visibility of Moire)

The touch sensor film which is an evaluation target was bonded to a liquid crystal display (LCD) through an optical clear adhesive (OCA) to prepare a touch panel. The display was observed from various angles in a state where the surrounding light environment is darkened and white display of LCD is performed, and visibility of moire was evaluated. In a case where a touch sensor film formed of a mesh pattern designed optimally with respect to a pixel pattern of the LCD was bonded, the evaluation point in a case where substantially no moire can be visible was set as 5 points, the evaluation point in a case where slight moire is visible was set as 4 points, the evaluation point in a case where moire is easily visible was set as 3 points, the evaluation point in a case where moire can be easily visible was set as 2 points, and the evaluation point in a case where moire can be immediately visible was set as 1 point. The points obtained by averaging evaluation results from 10 observers were respectively set as the evaluation points of moire visibility of the touch sensor film. That is, when the evaluation point is equal to or greater than 4 points, it is evaluated that there is no problems regarding moire in practice.

The results are shown in the following Table 1 and Table 2.

TABLE 1

| | Thickness of support [μm] | Annealing treatment temperature [° C.] | Rz of surface ruggedness shape [μm] | Thermal shrinkage in MD direction [%] | Thermal shrinkage in TD direction [%] | Visibility of moire |
|---|---|---|---|---|---|---|
| Example 1 | 75 | 150 | 4.3 | −0.22% | −0.05% | 5.0 |
| Example 2 | 75 | 140 | 4.0 | −0.24% | −0.06% | 5.0 |
| Example 3 | 75 | 130 | 3.6 | −0.27% | −0.07% | 5.0 |
| Example 4 | 50 | 150 | 4.9 | −0.32% | −0.07% | 4.8 |
| Example 5 | 50 | 140 | 4.5 | −0.34% | −0.08% | 5.0 |
| Example 6 | 50 | 130 | 4.1 | −0.39% | −0.09% | 5.0 |
| Example 7 | 38 | 150 | 5.6 | −0.37% | −0.08% | 4.5 |
| Example 8 | 38 | 140 | 5.2 | −0.40% | −0.10% | 4.7 |
| Example 9 | 38 | 130 | 4.6 | −0.43% | −0.12% | 5.0 |
| Example 10 | 25 | 150 | 6.1 | −0.42% | −0.09% | 4.0 |
| Example 11 | 25 | 140 | 5.9 | −0.52% | −0.12% | 4.3 |
| Example 12 | 25 | 130 | 5.4 | −0.60% | −0.16% | 4.6 |
| Comparative Example 1 | 75 | 170 | 6.2 | −0.20% | −0.04% | 3.8 |
| Comparative Example 2 | 75 | 160 | 6.3 | −0.23% | −0.04% | 3.9 |
| Comparative Example 3 | 50 | 170 | 7.1 | −0.28% | −0.06% | 3.4 |
| Comparative Example 4 | 50 | 160 | 6.5 | −0.31% | −0.06% | 3.7 |
| Comparative Example 5 | 38 | 170 | 8.3 | −0.32% | −0.07% | 2.6 |
| Comparative Example 6 | 38 | 160 | 7.3 | −0.38% | −0.07% | 3.3 |
| Comparative Example 7 | 25 | 170 | 9.3 | −0.37% | −0.08% | 2.2 |
| Comparative Example 8 | 25 | 160 | 8.3 | −0.42% | −0.08% | 2.7 |

It is found from the results shown in Table 1 that, Rz of the surface ruggedness shape are low values which are equal to or smaller than 6.1 in Examples 1 to 12 in which the support having a thickness smaller than 80 μm was subjected to the annealing treatment at a temperature equal to or lower than a temperature obtained by adding 35° C. to a dynamic glass transition temperature of the support, compared to the values in Comparative Examples 1 to 8 in which the support having a thickness smaller than 80 μm was subjected to the annealing treatment at a temperature higher than a temperature obtained by adding 35° C. to a dynamic glass transition temperature of the support, and thus, visibility of moire accompanied therewith are shown with high values which are equal to or greater than 4.0

It is found that, in Examples 1 to 12 in which the support having a thickness smaller than 80 μm was subjected to the annealing treatment at a temperature equal to or lower than a temperature obtained by adding 35° C. to a dynamic glass transition temperature of the support, the absolute value of thermal shrinkage in the MD direction is within 0.6%, the absolute value of thermal shrinkage in the TD direction is within 0.2%, and a predetermined rigidity is obtained.

TABLE 2

|  | Thickness of support [μm] | Annealing treatment temperature [° C.] | Rz of surface ruggedness shape [μm] | Thermal shrinkage in MD direction [%] | Thermal shrinkage in TD direction [%] | Visibility of moire |
|---|---|---|---|---|---|---|
| Example 13 | 75 | 150 | 3.8 | −0.22% | −0.05% | 5.0 |
| Example 14 | 50 | 150 | 4.2 | −0.32% | −0.07% | 5.0 |
| Example 15 | 38 | 150 | 4.7 | −0.37% | −0.08% | 5.0 |
| Example 16 | 25 | 150 | 5.3 | −0.42% | −0.09% | 4.7 |
| Example 17 | 75 | 140 | 3.5 | −0.24% | −0.06% | 5.0 |
| Example 18 | 50 | 140 | 3.9 | −0.34% | −0.08% | 5.0 |
| Example 19 | 38 | 140 | 4.3 | −0.40% | −0.10% | 5.0 |
| Example 20 | 25 | 140 | 5.0 | −0.52% | −0.12% | 4.8 |

It is found from the results shown in Table 2 that, Rz of the surface ruggedness shape are low values which are equal to or smaller than 5.3 μm, in Examples 13 to 20 in which the support is transported at a temperature equal to or higher than the static glass transition temperature and lower than the dynamic glass transition temperature of the support after performing the annealing treatment and until the support reaches the first pass roller, and the temperature of the support is decreased to a temperature lower than the static glass transition temperature while the support reaches the second pass roller from the first pass roller, compared the values in Examples 1, 2, 4, 5, 7, 8, 10, and 11 of Table 1 in which the treatment described above is not performed, and thus, visibility of moire accompanied therewith are shown with high values which are equal to or greater than 4.7.

TABLE 3

|  | Thickness of support [μm] | Annealing treatment temperature [° C.] | Rz of surface ruggedness shape [μm] | Thermal shrinkage in MD direction [%] | Thermal shrinkage in TD direction [%] | Visibility of moire |
|---|---|---|---|---|---|---|
| Example 21 | 75 | 150 | 3.2 | −0.22% | −0.05% | 5.0 |
| Example 22 | 50 | 150 | 3.6 | −0.32% | −0.07% | 5.0 |
| Example 23 | 38 | 150 | 3.7 | −0.37% | −0.08% | 5.0 |
| Example 24 | 25 | 150 | 4.5 | −0.42% | −0.09% | 5.0 |
| Example 25 | 75 | 140 | 2.9 | −0.24% | −0.06% | 5.0 |
| Example 26 | 50 | 140 | 3.3 | −0.34% | −0.08% | 5.0 |
| Example 27 | 38 | 140 | 3.4 | −0.40% | −0.10% | 5.0 |
| Example 28 | 25 | 140 | 4.2 | −0.52% | −0.12% | 5.0 |

It is found from the results shown in Table 3 that, Rz of the surface ruggedness shape are low values which are equal to or smaller than 4.5 µm, in Examples 21 to 28 in which the interval between the first pass roller and the second pass roller is set as 20 cm, compared to the values in Examples 13 to 20 of Table 2 in which the interval between the first pass roller and the second pass roller is set as 50 cm, and thus, visibility of moire accompanied therewith in all of the examples are shown with high values which are 5.0.

EXPLANATION OF REFERENCES

1: support
2: delivery roller
3: winding roller
4, 5, 6: pass roller
7: heater
8a, 8b: thin metal wire
9: first mesh electrode
10: second mesh electrode
11: first connector unit
12: second connector unit
13: first external connection terminal
14: first peripheral wiring
15: second external connection terminal
16: second peripheral wiring
17a, 17b: protective layer
21: touch sensor film
22: display device
23: detection unit
N: annealing treatment chamber
L1, L2: section
D: temperature dependence curve
F: inflection point
E1: base line
E2: tangent of inflection point
S: intersection point
P: pitch

What is claimed is:

1. A manufacturing method of a touch sensor film comprising:
    performing roll transportation of an elongated transparent support having a thickness smaller than 80 m using a plurality of pass rollers;
    performing annealing treatment with respect to the support at a temperature which is equal to or lower than a temperature obtained by adding 350 C to a dynamic glass transition temperature of the support; and
    forming a mesh pattern formed of thin metal wires on a surface of the support subjected to the annealing treatment,
    wherein the support is transported at a temperature equal to or higher than a static glass transition temperature and lower than a dynamic glass transition temperature of the support, after performing the annealing treatment with respect to the support and until the support reaches a first pass roller, and
    the temperature of the support is decreased to a temperature lower than the static glass transition temperature while the support reaches a second pass roller from the first pass roller.

2. The manufacturing method of a touch sensor film according to claim 1,
    wherein an interval between the first pass roller and the second pass roller is within 30 cm.

3. The manufacturing method of a touch sensor film according to claim 2,
    wherein an interval between the first pass roller and the second pass roller is within 20 cm.

4. The manufacturing method of a touch sensor film according to claim 1,
    wherein the annealing treatment is performed at a temperature equal to or higher than a temperature obtained by subtracting 10° C. from the dynamic glass transition temperature.

5. The manufacturing method of a touch sensor film according to claim 2,
    wherein the annealing treatment is performed at a temperature equal to or higher than a temperature obtained by subtracting 10° C. from the dynamic glass transition temperature.

6. The manufacturing method of a touch sensor film according to claim 3,
    wherein the annealing treatment is performed at a temperature equal to or higher than a temperature obtained by subtracting 10° C. from the dynamic glass transition temperature.

7. The manufacturing method of a touch sensor film according to claim 1,
    wherein the annealing treatment is performed at a temperature equal to or lower than a temperature obtained by adding 25° C. to the dynamic glass transition temperature.

8. The manufacturing method of a touch sensor film according to claim 2,
    wherein the annealing treatment is performed at a temperature equal to or lower than a temperature obtained by adding 25° C. to the dynamic glass transition temperature.

9. The manufacturing method of a touch sensor film according to claim 3,
    wherein the annealing treatment is performed at a temperature equal to or lower than a temperature obtained by adding 25° C. to the dynamic glass transition temperature.

10. The manufacturing method of a touch sensor film according to claim 1,
    wherein the thickness of the support is smaller than 50 µm.

11. The manufacturing method of a touch sensor film according to claim 2,
    wherein the thickness of the support is smaller than 50 µm.

12. The manufacturing method of a touch sensor film according to claim 3,
    wherein the thickness of the support is smaller than 50 µm.

* * * * *